(12) United States Patent
Schimelpfenig et al.

(10) Patent No.: US 10,594,252 B2
(45) Date of Patent: Mar. 17, 2020

(54) VARIABLE PROFILE SOLAR-TRACKING PHOTOVOLTAIC SYSTEM

(71) Applicant: SUNPOWER CORPORATION, San Jose, CA (US)

(72) Inventors: Mark Adam Schimelpfenig, Hayward, CA (US); Tyler Grushkowitz, Hayward, CA (US)

(73) Assignee: SunPower Corporation, San Jose, CA (US)

( * ) Notice: Subject to any disclaimer, the term of this patent is extended or adjusted under 35 U.S.C. 154(b) by 429 days.

(21) Appl. No.: 15/387,151

(22) Filed: Dec. 21, 2016

(65) Prior Publication Data

US 2018/0175783 A1  Jun. 21, 2018

(51) Int. Cl.
| | |
|---|---|
| *H02N 6/00* | (2006.01) |
| *H01L 31/042* | (2014.01) |
| *H02S 20/32* | (2014.01) |
| *F24S 30/425* | (2018.01) |
| *F24S 50/60* | (2018.01) |
| *F24S 25/12* | (2018.01) |
| *F24S 30/00* | (2018.01) |

(52) U.S. Cl.
CPC .............. *H02S 20/32* (2014.12); *F24S 25/12* (2018.05); *F24S 30/425* (2018.05); *F24S 50/60* (2018.05); *F24S 2030/11* (2018.05); *F24S 2030/136* (2018.05); *F24S 2030/19* (2018.05)

(58) Field of Classification Search
CPC ......... H02S 20/32; F24S 50/60; F24S 30/425; F24S 2030/19; F24S 2030/136; F24S 2030/11
See application file for complete search history.

(56) References Cited

U.S. PATENT DOCUMENTS

2017/0179872 A1* 6/2017 Almy ...................... H02S 20/32

* cited by examiner

*Primary Examiner* — Angelo Trivisonno
(74) *Attorney, Agent, or Firm* — Schwabe, Williamson & Wyatt, P.C.

(57) ABSTRACT

Described herein are improved solar tracker systems having variable profiles and related operating methods thereof. Solar-tracking PV systems with variable twisted or aerodynamic profiles offer several advantages including improved wind stability, improved shading characteristics and/or capability to correct system component misalignment. In an embodiment, motor drives (and locking devices if present) of a PV system can be driven against each other to cause a desirable twisted or aerodynamic profile of a torque tube and associated PV modules mounted on the torque tube. The desired twisted or aerodynamic profiles can range from a substantially flat horizontal plate to a twisted helix-like profile and combinations thereof so as to establish improved wind and/or shading characteristics. Advantages can also include a reduction in structural materials, increased structural strength, increased solar energy yield or a combination thereof.

20 Claims, 11 Drawing Sheets

VARIABLE PROFILE SOLAR-TRACKING PHOTOVOLTAIC SYSTEM

BACKGROUND

Large solar collector installations usually include an array of solar collector devices. Such systems can be used in conjunction with photovoltaic modules, thermal solar collector devices as well as concentrators for concentrating solar energy onto photovoltaic devices or thermal solar collection devices.

Some solar-tracking solar power systems, such as utility-scale photovoltaic installations, are designed to pivot a large number of solar modules to track the movement of the sun. For example, solar-tracking solar power systems may include rows of solar modules supported on respective torque tube assemblies. Each torque tube assembly may include several long shafts connected together in an end-to-end fashion. Furthermore, each torque tube assembly may be moved by a single motor, controlled by a dedicated controller.

Some of these solar collector systems include hardware for automatically adjusting the position of the collector devices to track the sun as it moves across the sky. This tracking movement can be accomplished in a number of different ways. Some systems use a single axis tracking system in which the collector devices pivot about a single axis. Such single axis type tracking systems often include a drive shaft or "torque tube" which defines a single pivot axis. A solar collector system may also include a number of support devices such as motors, controllers, and sensors to perform various support tasks to support or control the solar collector system.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are not drawn to scale.

DETAILED DESCRIPTION

Figure 1:
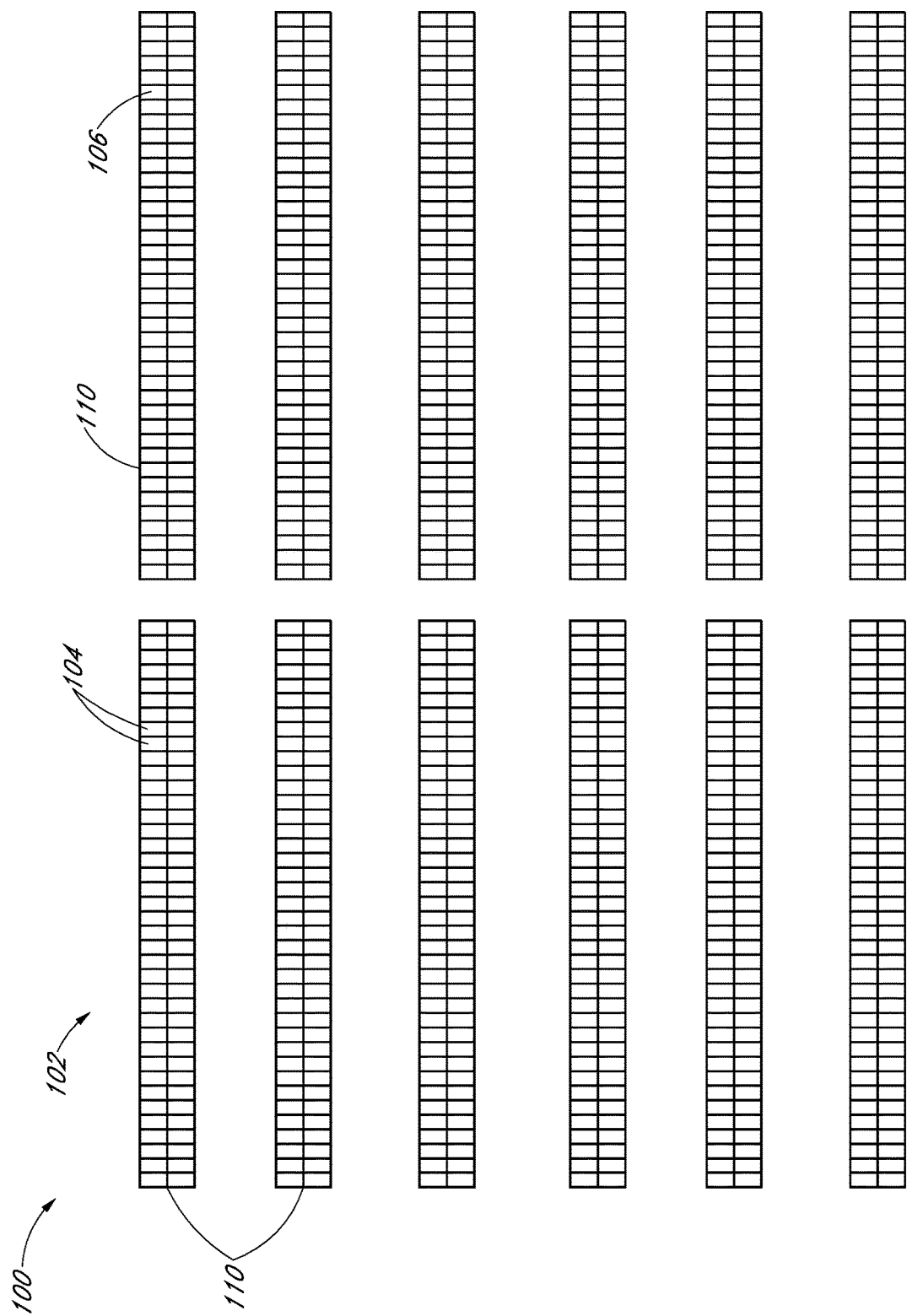
FIG. 1 depicts a top plan view of a solar-tracking photovoltaic (PV) system, in accordance with an embodiment of the present disclosure.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" motor drive does not necessarily imply that this motor drive is the first motor drive in a sequence; instead the term "first" is used to differentiate this motor drive from another motor drive (e.g., a "second" motor drive).

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

In addition, certain terminology may also be used in the following description for the purpose of reference only, and thus are not intended to be limiting. For example, terms such as "upper," "lower," "above," "below," "in front of," and "behind" refer to directions in the drawings to which reference is made. Terms such as "front," "back," "rear," "side," "outboard," "inboard," "leftward," and "rightward" describe the orientation and/or location of portions of a component, or describe the relative orientation and/or location between components, within a consistent but arbitrary frame of reference which is made clear by reference to the text and the associated drawings describing the component(s) under discussion. Such terminology may include the words specifically mentioned above, derivatives thereof, and words of similar import.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

Although many of the examples described herein are for solar-tracking photovoltaic (PV) systems, the techniques and structures may apply equally to other non-solar-tracking or stationary solar energy collection systems, as well as concentrated thermal solar systems, etc. Moreover, although much of the disclosure is described in terms of ground-mounted solar-tracking solar energy collection installations, the disclosed techniques and structures apply equally to other solar energy collection installations, e.g., rooftop or carport solar installations.

Existing single-drive solar-tracking solar power systems use a single motor to rotate an end or end section of a torque tube assembly to transmit torque to an opposite end or end section of the torque tube assembly. A single motor may also be used to rotate a center location of a torque tube assembly to transmit torque to a longitudinal separated location. PV collectors or modules mounted on the torque tube assembly may experience high wind loads that can excite a structure of the solar power system. More particularly, winds may apply drag to the PV modules, which can twist the torque tube.

In an aspect, a multi-drive solar-tracking PV system includes several drives inputting torque to a same torque tube at longitudinally separated locations. More particularly, the drives may be separated by a distance such that a span between driven supports maintains a system stiffness above a predetermined threshold. An overall torsional stiffness of such systems can be governed in part by a length of the torque tube assembly, and the length can be on a scale of one hundred feet or more. For example, the span between drives may be less than one hundred feet between adjacent drives of the system. Accordingly, a span between ends of a torque tube section may be effectively reduced to avoid wind excitation, e.g., by winds with speeds up to fifty or even ninety miles per hour.

Described herein are improved solar tracker systems having variable profiles and related operating methods thereof. As will be described below, solar-tracking PV systems with variable twisted or aerodynamic profiles offer several advantages including improved wind stability, improved shading characteristics and/or capability to correct system component misalignment. In an embodiment, motor drives (and locking devices if present) of a PV system can be driven against each other to cause a desirable twisted or aerodynamic profile of a torque tube and associated PV modules mounted on the torque tube. The desired twisted or aerodynamic profiles can range from a substantially flat horizontal plate to a twisted helix-like profile and combinations thereof so as to establish improved wind and/or shading characteristics. Advantages can also include a reduction in structural materials, increased structural strength, increased solar energy yield or a combination thereof.

FIG. 1 illustrates a top down view of a solar-tracking PV system 100 comprising a plurality of trackers 110 arranged into a solar array 102. In an embodiment, the solar-tracking PV system can be a row-level actuated (RLA) system such that each tracker 110 is actuated or operated individually. Each tracker 110 can comprise a plurality of solar collection modules or devices 104 having a top side 106 facing the sun to collect solar radiation and an under side 108 opposite the top side 106.

In the example depicted in FIG. 1, the solar-tracking PV system comprises row-level actuated (RLA) trackers 110 without a mechanical linkage between trackers. However, in other embodiments, a solar-tracking PV system can comprise a mechanical linkage for mechanically coupling two or more tracker rows. In such embodiments, a mechanical torque can be applied to one tracker and the mechanical torque can be transmitted to another tracker via the mechanical linkage.

Figure 2:
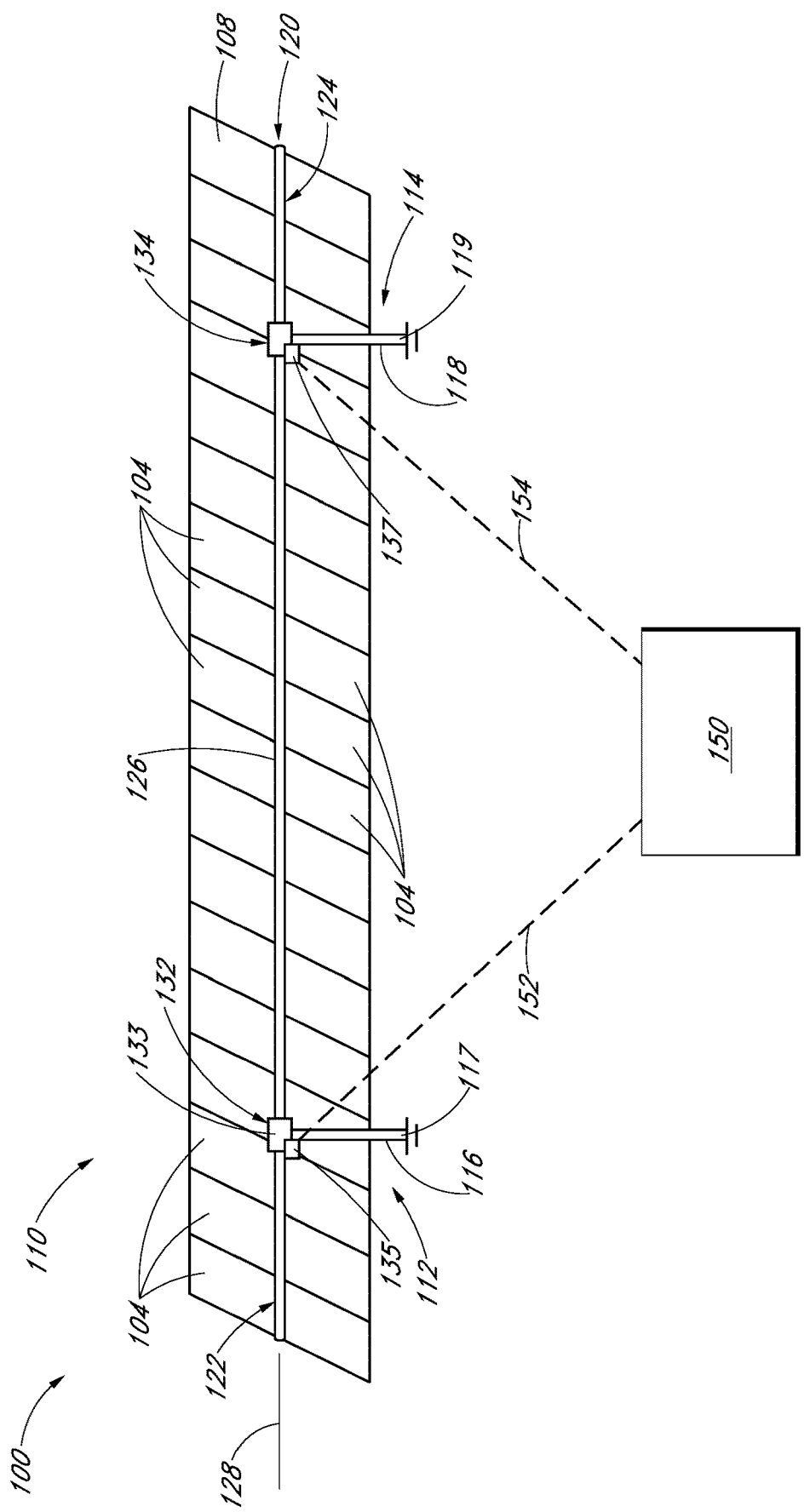
FIG. 2 depicts a side view of a solar-tracking PV system, in accordance with an embodiment of the present disclosure.

FIG. 2 depicts an under side 108 perspective view of tracker 110 comprising a torque tube 120 extending along a longitudinal axis 128. The torque tube 120 comprises a mid-section 126 between a first end section 122 and a second end section 124. The torque tube 120 can be supported above the ground by one or more support assemblies at longitudinally separated locations about the axis 128. Support assemblies can be driven, i.e., capable of inputting torque to a torque tube, or non-driven, i.e., allowing for rotation of torque tube without inputting torque to a torque tube. As depicted, tracker 110 comprises support assemblies 112, 114 each comprising a supportive stand, such as a drive pile or pier 116, 118. Drive piles 116, 118 can comprise a columnar structure, such as a C-, Z-, or I-beam, each having a lower end 117, 119 driven into the ground. Driven support assemblies can comprise an upper end of a pile supporting an actuator configured to provide a mechanical torque to a torque tube. Non-driven support assemblies can comprise an upper end of a pile supporting a bearing assembly configured to facilitate rotation of a torque tube. Any desirable number of support assemblies (driven and/or non-driven) can be employed in any desirable configuration.

The torque tube 120 can be of any desired dimension (diameter, length, etc.) and can be formed in one or more pieces or sections. The spacing of support assemblies 122, 124 relative to one another, can be determined based on the desired limits on deflection of the torque tube 120 between support assemblies, wind loads, torque tube stiffness and other factors. In some embodiments, the torque tube 120 is composed of a plurality of discrete portions or sections coupled together with one or more coupling assemblies to form a continuous torque tube. Any desired number or type of coupling assemblies can be used to couple adjacent torque tube sections together to form a continuous torque tube. In some embodiments, mid-section 126 of the torque tube 120 has a length greater than each of the lengths of the first and second end sections 122, 124 of the torque tube 120.

As depicted in FIG. 2, the first driven support assembly 112 comprises a rotational actuator, such as a motor drive 132, at the upper end of pile 116. The first motor drive 132 can be coupled to the torque tube 120 at the first end section 122 of the torque tube 120 so as to affect rotation of torque tube 104 about longitudinal axis 128. The torque tube 120 can be further supported by support assembly 114. In some embodiments, support assembly 114 can be a non-driven support assembly including a supportive stand, such as pile or pier and a bearing assembly. A non-driven support assembly along longitudinal axis 128 of torque tube 120 may support and allow for rotation of torque tube 120 about the longitudinal axis 128 without inputting torque to torque tube 120 so as to facilitate a stable rotation of torque tube 120 without actually driving such rotation. In some embodiments, the support assembly 114 can comprise a locking device or mechanism for restraining the second end section 124 of the torque tube 120 so as to impede rotation at the second end sections 124.

In several embodiments described herein, tracker 110 of solar-tracking PV system 100 can be considered a multi-drive system for tracker configurations in which several motor drives are coupled to a same torque tube to input torque to the torque tube at longitudinally separated locations. In one multi-drive embodiment, tracker 110 can further comprise a second motor drive 134 coupled to the second end section 124 of the torque tube 120. As depicted, the first and second motor drives 132, 134 can be spaced apart to define mid-section 126 of the torque tube 120. In the example depicted in FIG. 2, tracker 110 can be considered a dual-drive system having a pair of motor drives coupled to respective ends of the same torque tube 120, or torque tube section. In yet other embodiments, a non-driven support assembly could be positioned longitudinally between first driven support assembly 112 and second driven support assembly 114 (not depicted).

Motor drive(s) of solar-tracking PV system 100 can be of any type or design (e.g., pneumatic, hydraulic, mechanical, electro-mechanical, etc.) and can be driven against each other to cause twist in the torque tube at end sections and/or at mid-sections between drives. In an embodiment, motor drive(s) are configured to convert electrical power input into a mechanical torque output. For example, motor drive 132 can output torque directly to a driven end, e.g., first driven end 122, of torque tube 120.

In an embodiment, motor drive(s) can include a gearbox having an output coupling that connects directly to a torque tube. For example, gearbox 133 of motor drive 132 can include a rotational output attached to first driven end 122 to rotate torque tube 120 about longitudinal axis 128. In some embodiments, gearbox 133 of motor drive 132 includes a worm drive coupled to the rotational output. More particularly, gearbox 133 of motor drive 132 can include a worm gear driven by a worm. Worm drives are known in the art, and thus further description of particular worm drive configurations is not provided here. The worm gear may be mounted within a gearbox housing, and the worm gear may be arranged along longitudinal axis 128 and coupled to the rotational output to input torque to first driven end 122 of torque tube 120. In some embodiments, a gearbox worm of motor drive 132 can be coupled to an input actuator, such as a gearmotor 135. Gearmotors can deliver torque to worm through an output shaft. Thus, electrical power input delivered to a gearmotor 135 of motor drive 132 can be converted into input torque to the worm, and the input torque can be transmitted from the worm to the worm gear to output mechanical torque to first driven end 122.

A plurality of PV modules 104 are mounted on the torque tube 120 along longitudinal axis 128. Several PV modules 104 can be mounted on torque tube 120 along longitudinal axis 128. For example, solar-tracking PV system 100 can include a row of tens of solar modules arranged in a series. The series may include, for example, 70-100 PV modules 104 between a first outward end section 122 and a second outward end section 124. Each PV module 104 may include one or more solar collecting devices. For example, each PV module 104 may include a PV laminate mounted on a PV frame. The PV laminates may be configured to receive sunlight for conversion into electrical energy. For example, the PV laminates may include one or more PV cells laminated between an optically transparent upper cover and/or back cover. Each PV frame may support a respective PV laminate along an outer perimeter and/or a back surface of the laminate structure. The PV frame may be mounted on torque tube 120 using any desirable mounting component or system.

In an embodiment, a solar-tracking PV system comprises a controller operatively coupled to one or more motor drives. Additionally, controller 150 can be operatively coupled to a locking device or mechanism, if present. As depicted in FIG. 2, controller 150 can be communicatively and/or electrically coupled to the first and second motor drives 132, 134. The controller 150 can be physically located on tracker 110 or can be physically separate from tracker 110 and communicate in a wired or wireless manner. In one embodiment, tracker 110 comprises a single controller 150 to control the motor drives 132, 134 so as to input torque to the first and second ends 122, 124. In an embodiment, gearmotors 135, 137 can be electrically coupled to controller 150, and controller 150 can manage the delivery of electrical power to gearmotors 135, 137 to control the output torque delivered to torque tube 120.

Controller 150 can simultaneously control a plurality of motor drives by controlling the delivery of electrical power to a gearmotor associated with each motor drive to achieve a desired torque at longitudinally separated input locations on torque tube 120. More particularly, controller 150 can independently control a plurality of motor drives 132, 134 to input a same or a different torque at end sections and/or mid-sections of torque tube 120.

In one embodiment, a single controller 150 can control several motor drives 132, 134. For example, controller 150 may be operatively connected to first motor drive 132 attached to first end section 122 of first torque tube 120, and controller 150 can be operatively connected to second motor drive 134 attached to second end section 124. Accordingly, a gearmotor of respective motor drives 132, 134 can be controlled by controller 150 to input power to a singular torque tube 120 and/or a torque tube assembly. In other embodiments, multiple local controllers can be employed to control a tracker.

Driven support assemblies 112, 114 may affect rotation of torque tube 104 about longitudinal axis 128 based on electrical inputs provided or controlled by controller 150. Controller 150 may include a microprocessor or computer configured to control the delivery of electrical power to motors 132, 134 of driven support assemblies 112, 114 along torque tube 120. For example, controller 150 may directly or indirectly, e.g., through control of a power supply, deliver a first electrical power input 152 to first driven support assembly 112 and a second electrical power input 154 to second driven support assembly 114. Accordingly, the motors 132, 134 and/or mechanical transmission components of the driven support assemblies 112, 114 may be simultaneously controlled by controller 150 to input torque to first end 122 and second end 124 of a section of torque tube 120. More particularly, driven support assemblies 112, 114 may apply the torque to first end 122 and second end 124 about longitudinal axis 128. Thus, torque tube 120 may pivot or rotate about longitudinal axis 128 such that PV modules 104 track a solar source, e.g., the sun or a reflective surface redirecting sunrays toward PV modules 104.

Figure 3:
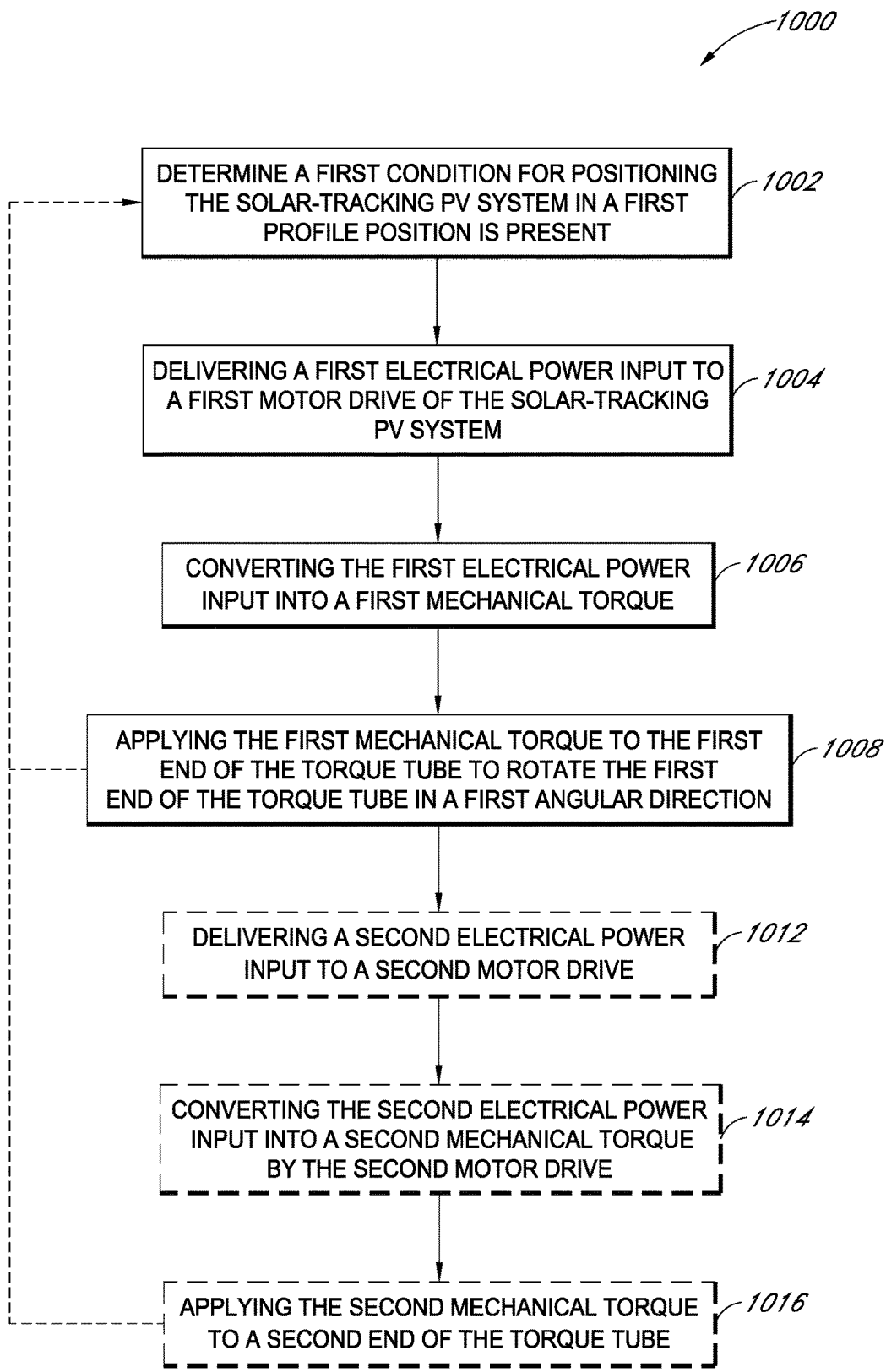
FIG. 3 depicts a method of operating a solar-tracking PV system, in accordance with an embodiment of the present disclosure.

Methods of operating solar-tracking PV systems are also described herein. FIG. 3 depicts a flowchart 1000 listing operations in a method of operating a solar-tracking PV system, in accordance with an embodiment of the present disclosure. Optional operations of flowchart 1000 are indicated by dashed lines. In one embodiment, operations of flowchart 1000 can occur in sequence. In other embodiments, two or more operations of flowchart 1000 can occur simultaneously.

Referring to operation 1002 of flowchart 1000, a method of a solar-tracking PV system comprises determining a first condition is present for positioning the solar-tracking PV system in a first, twisted or aerodynamic profile position. The first condition can be any desirable condition for varying the profile of one or more tracker rows, for example an ambient weather condition, an elapsed time, a time of day, a solar insolation and so on.

PV modules mounted on the torque tube can experience high wind loads which can translate to torsional and bending loads on the torque tube. In an embodiment, ambient wind loads experienced by the solar-tracking PV system 100 can be minimized by positioning one or more trackers 110 into a first or twisted aerodynamic profile position. At operation 1002 of flowchart 1000, a first condition can comprise determining that an ambient environmental condition is beyond a predetermined threshold limit. In one embodiment, an ambient wind speed and/or an ambient wind direction is determined at operation 1002. For example, an ambient wind speed can be estimated or measured and then compared to a maximum wind speed, e.g., a predetermined threshold or maximum wind speed of 80 km/h (50 mph). As another example, a solar insolation or shading condition is determined to be present at operation 1002 such that the solar-tracking PV system is positioned in a first or improved shading profile position.

In some embodiments, determining an ambient environmental condition comprises sensing an ambient wind speed, wind direction, a solar insolation or a combination thereof. For example, the solar-tracking PV system 100 can comprise one or more sensors (e.g., an anemometer, one or more lasers, a strain gauge, an inclinometer, etc.) for measuring an ambient environmental condition and/or system properties or positions. In another embodiment, an ambient environmental condition can be estimated from current or future weather data communicated to solar-tracking PV system 100. For example, a signal encoding an estimated or sensed environmental condition can be transmitted to controller 150. As yet another example, one or more PV modules 104 can provide information relating to solar insolation.

Other feedback signals can be collected by the controller 150 to determine performance of motor drive 132 (and/or 134 if present). For example, in addition to sensing electrical power input to motor drive(s), controller 150 may receive feedback from sensors that monitor torque applied by wind, wind speed and direction, and misalignment of system components. Any characteristic relevant to system performance or efficiency may be sensed, and corresponding sensor data may be provided to controller 150 to determine that the tracker should be placed in a twisted or aerodynamic profile position.

Figure 4:
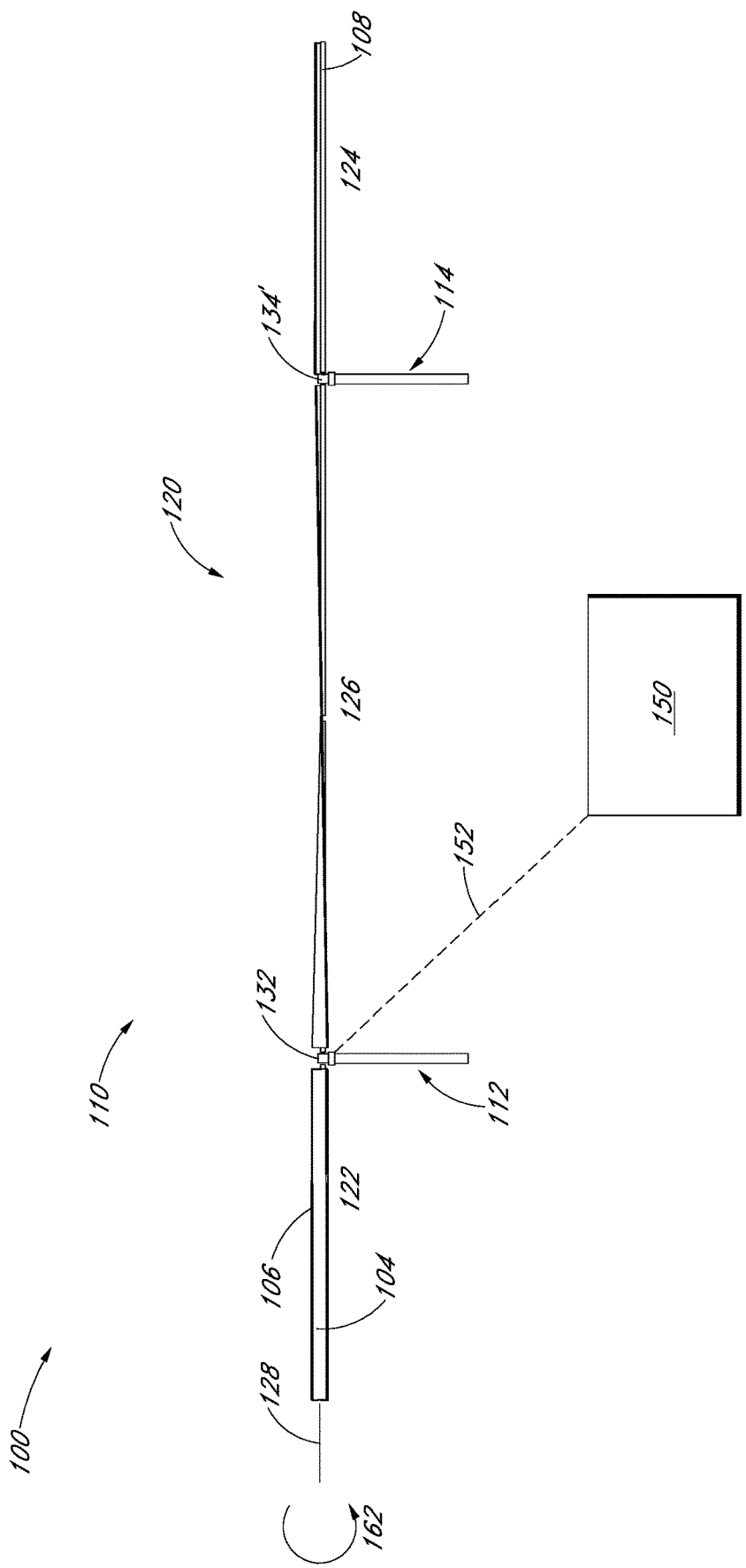
FIG. 4 depicts a side view of a solar-tracking PV system, in accordance with an embodiment of the present disclosure.

Referring to operation 1004 of flowchart 1000 and corresponding FIG. 4, a method of operating a solar-tracking PV system comprises delivering a first electrical power input 152 to the first motor drive 132 by the controller 150. At operation 1006, the first motor drive 132 can convert the first electrical power input 152 into a first mechanical torque. That is, gearmotor 135 of the motor drive 132 can convert the electrical power input to a mechanical torque 162 at an output shaft, and the output mechanical power may be transmitted to a worm gear of the gearbox 133 and the output of the motor drive 132.

Referring to operation 1008, the first mechanical torque can be applied to the first end 122 of the torque tube 120 to rotate the first end section 122 of torque tube 120 in a first angular direction 162 about the longitudinal axis 128. As depicted in FIG. 4, the rotation of the first end section 122 and a portion of the mid-section 126 of torque tube 120 can tilt PV modules 104 located at or towards first end section 122. In other words, the relative pitch of PV modules 104 at or towards first section 122 can be altered such that the solar-tracking PV system 100 is positioned in a first twisted profile position. In an embodiment, the first mechanical torque can applied to the first end section 122 in a first angular direction 162 about the longitudinal axis 128 substantially opposite to a directional component of the ambient wind velocity determined at operation 1002. In an embodiment, it can be determined at operation 1002 that an ambient wind speed, direction or combination thereof is above a predetermined threshold for positioning the solar-tracking PV system in a first twisted profile position.

In some embodiments, the method of operating a solar-tracking PV system can further comprise restraining a second end section of a torque tube as a first end section of the same torque tube is rotated in a first angular direction. In one embodiment, the second end section 124 of torque tube 120 can be restrained with a locking device or mechanism at 134' of support assembly 114 (such that support assembly 114 is a non-driven support assembly). In another embodiment, the second end section 124 of torque tube 120 can be restrained with a motor drive at 134' of support assembly 114 (such that support assembly 114 is a driven support assembly). As depicted in FIG. 4, the second end section 124 of the torque tube 120 can be restrained as the first end section 122 of torque tube 120 is rotated in first angular direction 162. The rotation of the first end section 122 and a portion of the mid-section 126 of torque tube 120 can tilt PV modules 104 located at or towards first end section 122, whereas PV modules 104 located at or towards second end section 124 can remain substantially parallel to a horizontal plane.

Figure 5:
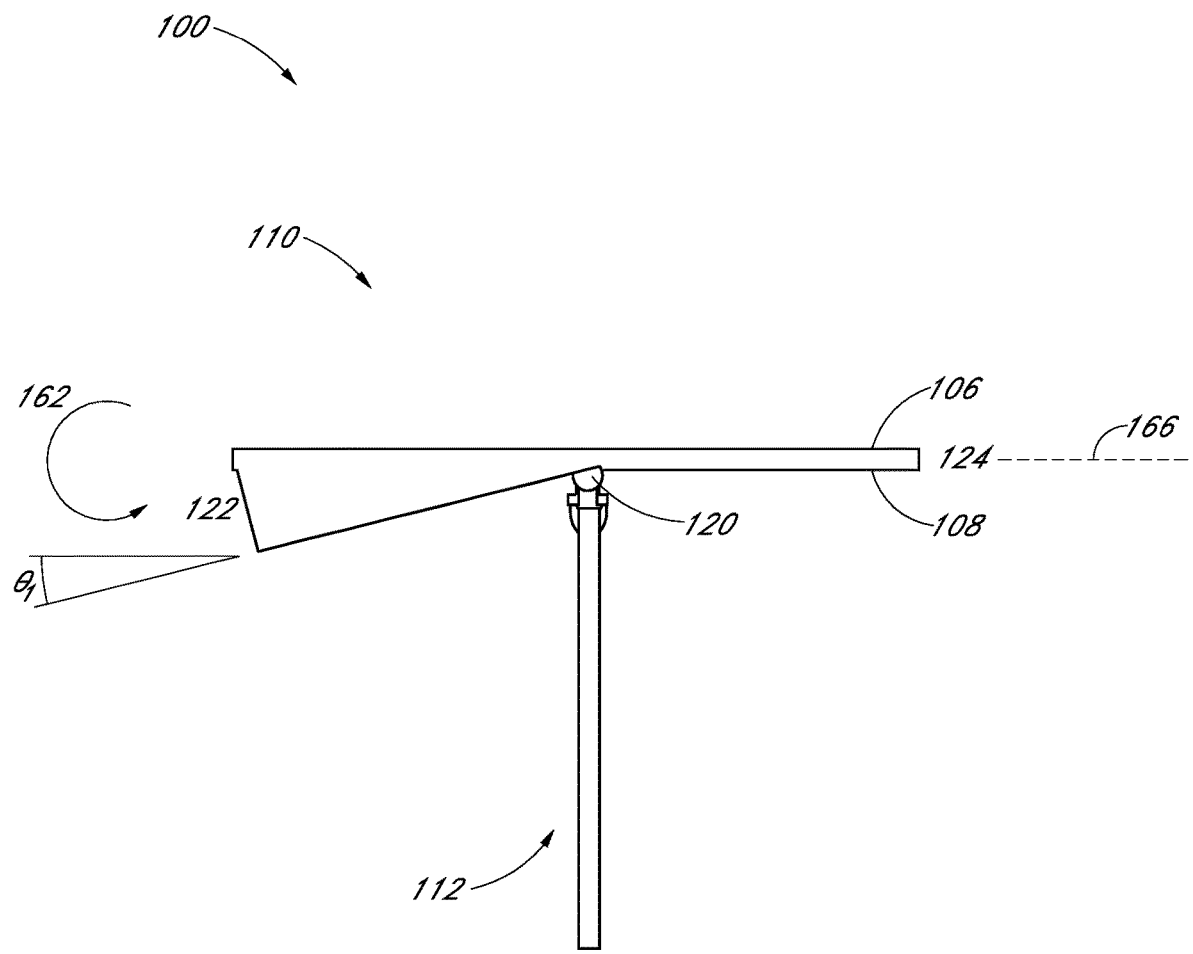
FIG. 5 depicts a side view of a solar-tracking PV system, in accordance with an embodiment of the present disclosure.

Motor drive(s) can rotate one or more sections of a torque tube from an initial or starting angle to a desired twist angle or maximum angle of twist in a particular rotational direction. In an embodiment, a first end section of a torque tube can be rotated to a first predetermined twist angle relative to a horizontal plane such that the solar-tracking PV system is positioned in a first, twisted, or aerodynamic profile position. FIG. 5 depicts a side view of tracker 110 looking down longitudinal axis 128, i.e., longitudinal axis 128 extends into plane of FIG. 5. At operation 1008 of flowchart 1000, the first end section 122 of torque tube 120 can be rotated to a first twist angle $\theta_1$ as depicted in FIG. 5. As one example, the first end section 122 of torque tube 120 can be rotated to a twist angle $\theta_1$ less than or equal to ten degrees relative to a horizontal plane 166. As another example, the first end section 122 of torque tube 120 can be rotated to a twist angle $\theta_1$ less than or equal to five degrees relative to horizontal plane 166. The first end section 122 of torque tube 120 can be rotated to a twist angle $\theta_1$ in a range of five to ten degrees relative to horizontal plane 166. As depicted in FIG. 5, the second end section 124 of torque tube 120 can remain without rotation or be maintained such that the second end section 124 is substantially parallel to the horizontal plane 166.

Figure 6:
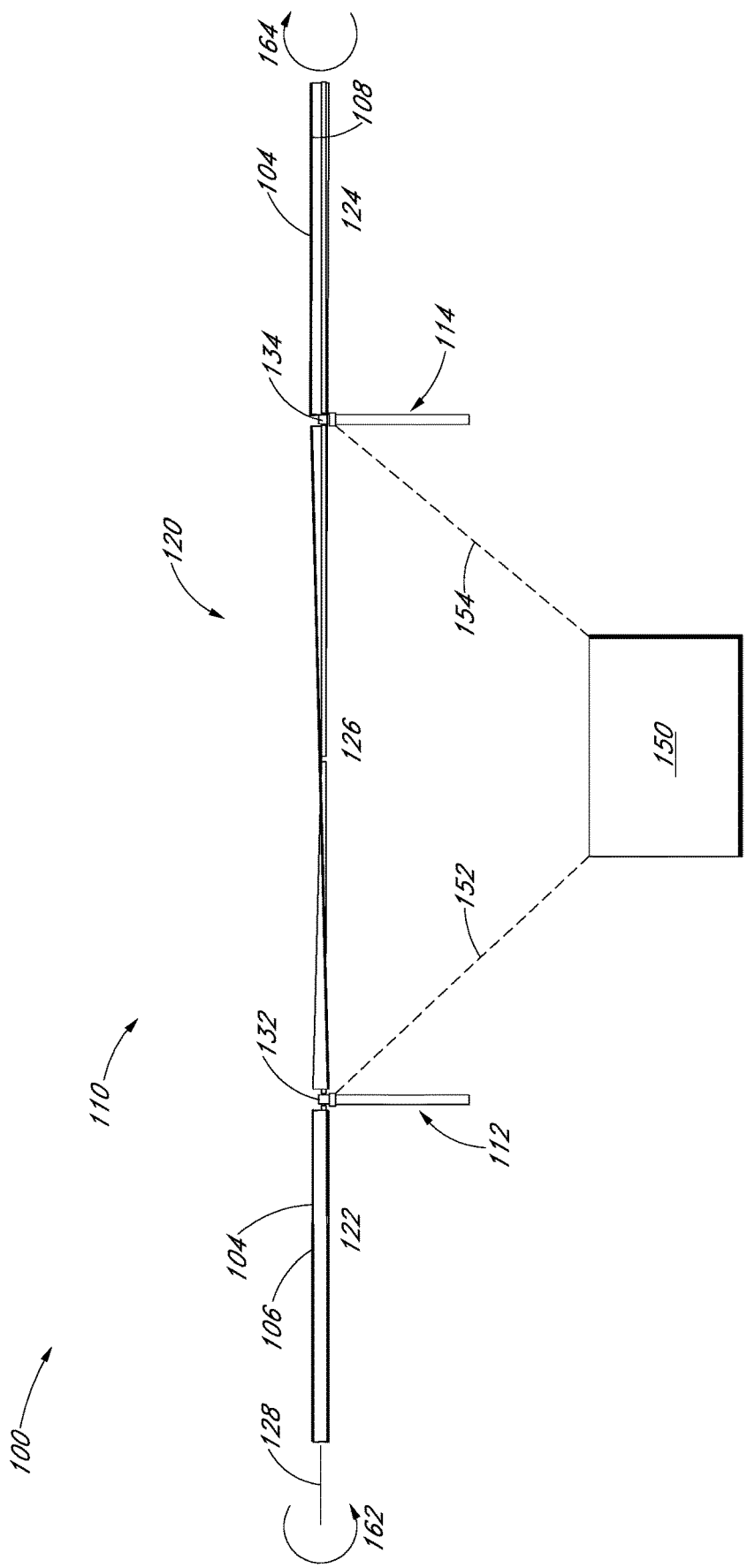
FIG. 6 depicts a side view of a solar-tracking PV system, in accordance with an embodiment of the present disclosure.

In various embodiments, a tracker of a solar-tracking PV system comprises more than one motor drive coupled to a same torque tube with the capability of inputting torque to the same torque tube at longitudinally separated locations. As depicted in FIG. 6, tracker 110 comprises a first motor drive 132 coupled to first end section 122 of torque tube 120 and a second motor drive 134 coupled to second end section 124 of torque tube 120. Referring to optional operation 1012 of flowchart 1000 and corresponding FIG. 6, a method of operating a solar-tracking PV system comprises delivering a second electrical power input 154 to the second motor drive 134 by the controller 150.

At optional operation 1014, the second motor drive 134 can convert the second electrical power input 154 into a second mechanical torque. To track a solar sources, the first electrical power input 152 can be equal to second electrical power input 154, and assuming identical efficiencies of the pair of motor drives 132, 134, an identical torque may be generated at the output of the first motor drive 132 and the output of the second motor drive 134. In some conditions where it is desirable to position the system 100 into a twisted profile position, the first electrical power input 152 can be different than the second electrical power input 154, and different torques can be generated at the output of the first motor drive 132 and the output of the second motor drive 134.

Referring to optional operation 1016, the second mechanical torque 164 can be applied to second end section 124 of torque tube 120 to rotate second end section 124 of torque tube 120 in a second angular direction 164 about the longitudinal axis 128 As depicted in FIG. 6, the rotation of the second end section 124 of torque tube 120 can tilt PV modules 104 at or towards second end section 124 as the first end section 122 of torque tube 120 is rotated in first angular direction 162. In other words, the relative pitch of PV modules 104 at or towards second end section 124 are altered such that the solar-tracking PV system 100 is positioned in a twisted or aerodynamic profile position. In an embodiment, the controller can control the first and second motor drives 132, 134 independently to input different torques to the first end section 122 and the second end section 124 of the torque tube 120 to twist the mid-section 126 of the torque tube 120.

Figure 7:
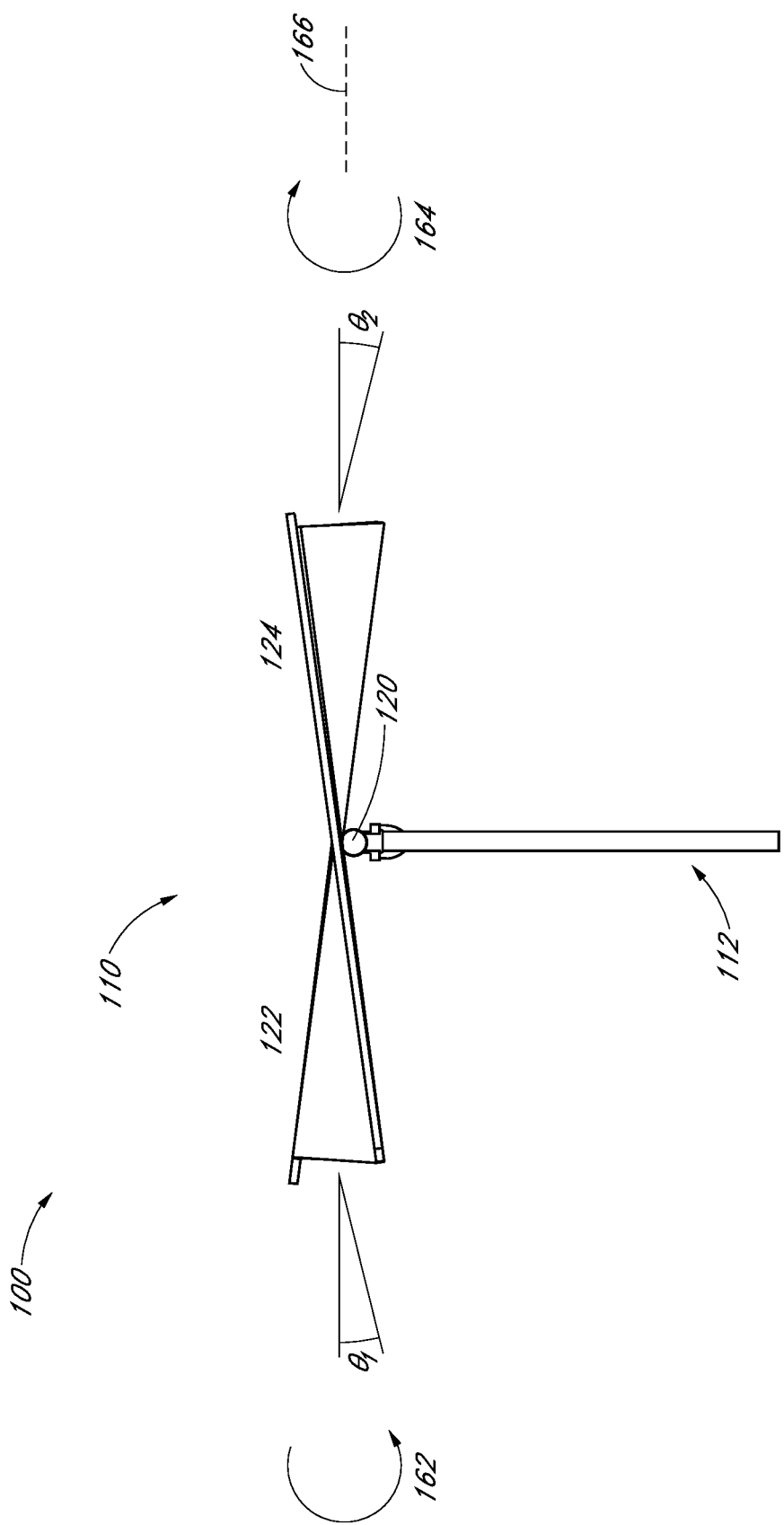
FIG. 7 depicts a side view of a solar-tracking PV system, in accordance with an embodiment of the present disclosure.

FIG. 7 depicts a side view of tracker 110 looking down longitudinal axis 128, i.e., longitudinal axis 128 extends into plane of FIG. 7. At operation 1008 of flowchart 1000, the first end section 122 of torque tube 120 can be rotated to a first twist angle $\theta_1$. At operation 1016 of flowchart 1000, the second end section 122 of torque tube 120 can be rotated to a second twist angle $\theta_2$ as depicted in FIG. 7. In the embodiment depicted in FIG. 5, the second end section 124 of torque tube 120 is substantially parallel to horizontal plane 166, i.e., a rotation of zero degrees. In other embodiments, the second end section 124 of torque tube 120 can be rotated to a twist angle $\theta_2$ less than or equal to ten degrees relative to horizontal plane 166. As yet another example, the second end section 124 of torque tube 120 can be rotated to a twist angle $\theta_2$ less than or equal to five degrees relative horizontal plane 166.

In an embodiment, the first end section 122 of torque tube 120 is rotated in a first angular direction 162 about the longitudinal axis 128 and the second end section 124 of the torque tube 120 is rotated in second angular direction 164 about the longitudinal axis 128. In one embodiment, the second angular direction 164 is opposite the first angular direction 162 such that the torque tube is twisted about the longitudinal axis 128, thereby positioning the solar-tracking PV system in a twisted or aerodynamic profile position. Alternatively, the second angular direction 164 can be in the same direction as the first angular direction 162, for example to position the solar-tracking system 100 in another profile position like a directed solar-tracking position.

In an embodiment, motor drives (and locking devices if present) of a solar tracker can be driven against each other to cause any desirable twisted, shading or aerodynamic profile of a torque tube and PV modules mounted on the torque tube. The desired twisted, shading or aerodynamic profile can range from a flat horizontal plate to a twisted helix-like profile and combinations thereof so as to establish improved wind and/or shading characteristics of a solar-tracking PV system. Advantages can include a reduction in structural materials, increased structural strength, increased solar energy yield or a combination thereof. One or more trackers of a solar-tracking PV system can comprise any desirable number of motor drives, locking devices and/or torque tube sections.

The controller 150 can independently control one or more motor drives 132, 134 to input different torques to opposite ends of torque tube 120. For example, a torque generated at an output shaft of the gearmotor 135 of the first motor drive 132 may differ from a torque generated at an output shaft of the gearmotor 137 of the second motor drive 134. The difference in torque may be proportional to, or correlate with, the difference in electrical power input to the gearmotors 135, 137. The different output shaft torques may be transmitted through the motor drives 132, 134. Thus, at operation 1008, a first mechanical torque may be applied by the first motor drive 132 to first driven end section 122 of torque tube 120. Similarly, at operation 1016, a second mechanical torque, different than the first mechanical torque, can be applied by second motor drive 134 to second driven end section 124 of torque tube 120. The independently controlled motor drives 132, 134 may therefore input different torques to first end section 122 and second end section 124 of torque tube 120. As a result, a net torsion may be applied to torque tube 120 to twist torque tube 120 between first end 122 and second end 124. As torque tube 120 twists, a relative pitch of PV modules 104 mounted on torque tube 104 may be altered. For example, the torque tube can twist into a helix-like configuration such that the front surfaces 106 of PV modules 104 mounted near first end section 122 face in a different or opposite direction from the front surfaces 106 of PV modules 104 mounted near second end section 124 such as depicted in FIG. 6 and FIG. 7.

In an embodiment, the method of operating a solar-tracking PV system comprises monitoring the first and/or electrical power input 152, 154. The method can further comprise determining a first condition is present based on the monitored first and/or second electrical power input 152, 154. The controller 150 can sense electrical power input to one or more motor drives performance (e.g., resistance to rotation due to high wind loads) so as to monitor torque applied by wind, wind speed and direction, and/or misalignment of system components. Any characteristic relevant to system performance or efficiency may be determined, monitored, and/or provided to controller 150.

Controller 150 can be a "smart" controller configured to diagnose efficiencies in the motor drives 132, 134 due to changing ambient conditions (e.g., increased wind speeds) and/or system inefficiencies (e.g., misalignment of support assemblies). At operations 1004 and 1012, first electrical power 152 can be input to the first motor drive 132, and second electrical power 154 can be input to the second motor drive 134. Since the power transmission components may have a known efficiency, e.g., a design efficiency or an experimentally determined efficiency, an electrical power input requirement to achieve a predetermined torque or movement of torque tube 120 may be determined.

In some embodiments, first electrical power input 152 and/or second electrical power input 154 can be monitored at operation 1008 and/or 1016. For example, controller 150 can servo a power supply and/or directly measure the electrical power being delivered to the motor drives 132, 134 to determine the electrical power input values. Ambient and/or system characteristics can be derived from the electrical power input data gathered through the monitoring. An optional feedback loop can be employed from operation 1008 and/or 1016 to 1002 such that ambient conditions, e.g., wind velocity, can be determined based on the monitored system characteristics, e.g., the electrical power inputs to produce mechanical torques. For example, the first condition for positioning the solar-tracking PV system in the first twisted profile position (e.g., high wind loads due to wind speeds above a predetermined threshold) can be determined to be present if the first motor drive 132 demands more electrical power than some predetermined electrical power threshold to achieve a desired torque. As another example, the first condition for positioning the solar-tracking PV system in the first twisted profile position can be determined to be present if the first motor drive 132 demands more electrical power than the second motor drive 134 to achieve a desired torque.

As depicted in FIG. 6 and FIG. 7, the first end section 122 and a portion of the mid-section 126 of torque tube 120 tilts PV modules 104 located at or towards first end section 122 in first direction 162. Concurrently, the second end section 124 and a portion of the mid-section 126 of torque tube 120 tilts PV modules 104 located at or towards second end section 124 in second direction 164, wherein the first direction 162 is opposite to the second direction 164. In this twisted profile position, the tracker 110 can be positioned such that half of the tracker (e.g., towards first end section) is positioned into the ambient wind, and the other half the tracker 110 (e.g., towards second end section) is positioned against the ambient wind. These forces can counter balance each other, and thus reduce the stresses or loads on the motor drives.

A method of operating a solar-tracking PV system can include transitioning trackers between a range of twisted or aerodynamic positions based on changing ambient conditions. In another embodiment, the PV system 100 can be positioned in a first profile position and it can then be determined at operation 1002 that an ambient wind speed, direction or combination thereof is above a predetermined threshold for moving the solar-tracking PV system from a first profile position to a second profile position. The PV system can be transitioned to or from any desired twisted, shading or aerodynamic profile position so as to establish improved wind, shading and/or operating characteristics.

In another embodiment, an optional feedback loop can be employed such that at operation 1002, a relative performance of the motor drives 132, 134 or identification of torque tube misalignment 120 can be determined based on the monitored system characteristics, e.g., the electrical power inputs. As another example, when the required electrical input to achieve a predetermined torque exceeds a threshold value, it may be determined that there is a problem with the motor drive(s). Such a diagnosis can be made through comparison between first electrical power input 152 and second electrical power input 154. For example, when the first motor drive 132 demands more electrical power than the second motor drive 134 to achieve a predetermined torque, it may be determined that a component of the first motor drive 132 is failing. Thus, a relative performance of the motor drives 308 may be determined to trigger a system maintenance procedure.

In an embodiment, the motor drives can operate under active or real-time feedback control as ambient wind conditions change. An active feedback control loop can include a monitoring operation such that the stress in the torque tube or deflection of the PV modules is monitored in real-time. For example, as the wind loads increase, additional deflection at each end of the tracker can occur. In response, the motor drives can increase or decrease the applied torque so that the deflection or angle of twist at the end of each tracker is kept constant. In other words, the controller can alter the electrical inputs to the motor drive(s) so as to position the torque tube into a twist that will be fully supported by the wind.

In some embodiments, tracker 110 comprises two motor drives 132, 134 such as depicted in FIG. 6 (or one motor drive 132 and one locking device 134' such as generally depicted in FIG. 4) so as to define three torque tube sections: first end section 122, second end section 124 and mid-section 126. In other embodiments, a tracker can comprise more than two motor drives and/or locking devices such as depicted in FIG. 8.

FIG. 1-7 illustrate various embodiments of PV assemblies and flexible grounding connectors. Unless otherwise specified below, the numerical indicators used to refer to components in FIG. 8-11 are similar to those used to refer to components or features in FIG. 1-7 above, except that the index has been incremented by 100.

Figure 8:
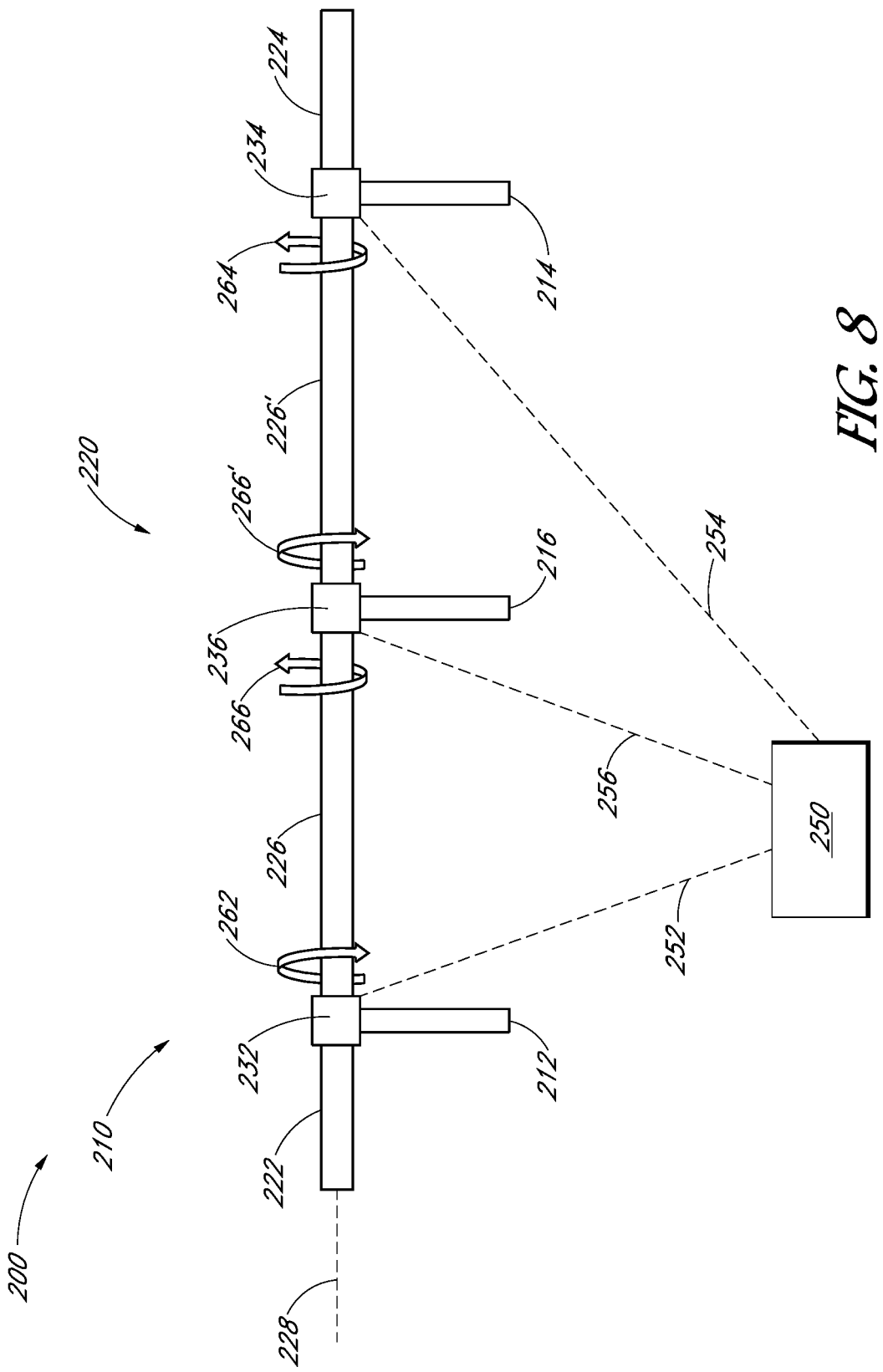
FIG. 8 depicts a side view of a solar-tracking PV system, in accordance with an embodiment of the present disclosure.

FIG. 8 depicts a side view of a tracker 210 of solar-tracking photovoltaic (PV) system 200 comprising a torque tube 220 extending along a longitudinal axis 228. PV modules supported on torque tube 220 are not shown in FIG. 8 for clarity. Three support assemblies 212, 214, 216 each support three motor drives 232, 234, 236 provided at longitudinally separated locations about longitudinal axis 228 of torque tube 220 so as to define an first end section 222, a second end section 224, a first mid-section 226 and a second mid-section 226'. Each motor drive 232, 234, 236 is coupled to torque tube 220 so as to affect rotation of nearby sections of torque tube 220 about longitudinal axis 228. More particularly, motor drive 232 affects rotation of the first end section 222 and first mid-section 226, motor drive 234 affects rotation of the second end section 224 and second mid-section 226' and, motor drive 236 affects rotation of the first mid-section 226 and second mid-section 226'.

A net torsion can be introduced into torque tube 220 by applying different torques to end sections 222, 224 and mid-sections 226, 226'. The torques applied by each motor drive can be in similar angular directions, opposite angular directions or any desirable combination thereof. In the example depicted in FIG. 8, the first motor drive 232 applies a first torque in a first angular direction 262 to the first end section 222 and a nearby portion of the first mid-section 226. The second motor drive 232 applies a second torque in a second angular direction 264 to the second end section 224 and a nearby portion of the first mid-section 226'. In some embodiments, a motor drive can apply different torques to nearby torque tube sections. For example, the third motor drive 236 can apply a third torque in the second angular direction 266 to the first mid-section 226. The third motor drive 236 can further apply a fourth torque in the first angular direction 266' to the second mid-section 226'.

Twisting torque tube 120, 220 as described above can be used to achieve several functional advantages including improved wind dynamics, improved efficiencies under low solar insolation or shaded conditions, improved misalignment tolerances due to installation imperfections, improved balancing of stresses and inhibition of wind vortices forming across a PV array.

Figure 9:
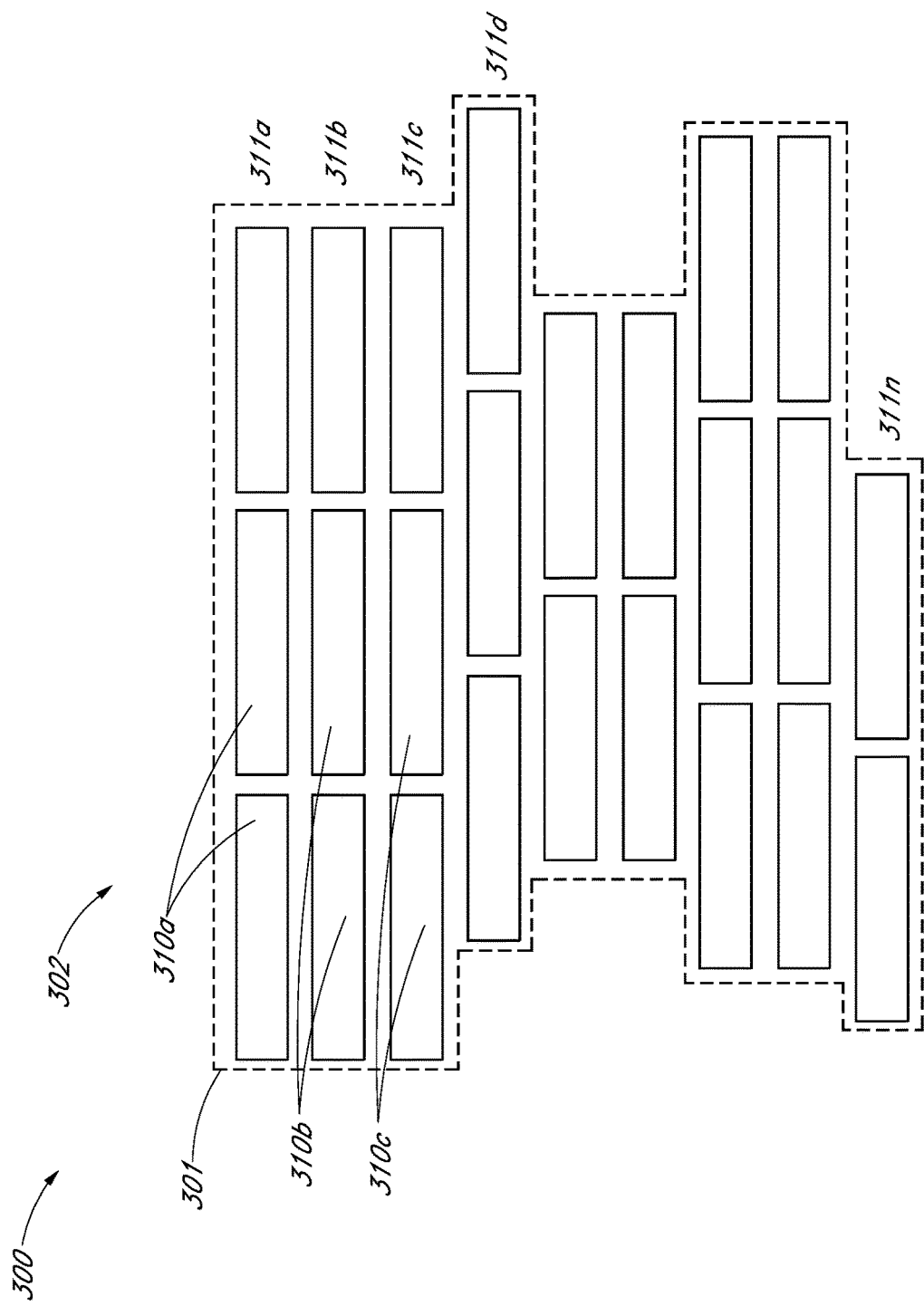
FIG. 9 depicts a top plan view of a solar-tracking PV system, in accordance with an embodiment of the present disclosure.

In an embodiment, improved wind dynamics for a solar-tracking PV system can be achieved by positioning the PV system into a twisted or aerodynamic profile position based on ambient winds approaching the PV array. Changing the pitch of PV modules relative to each other can change wind dynamics such that less wind drag is applied to the entire PV system, and thus, a likelihood of system failure under wind loading can be reduced. Furthermore, changing the pitch of PV modules relative to each other can inhibit high wind loads and/or wind vortices from forming in or across a PV array. A PV array can comprise different tracker types arranged in any desirable configuration. In the example depicted in FIG. 9, PV trackers 310 of solar-tracking PV system 300 can be arranged so as to maximize the coverage of a particular area which can be dependent on various geographical features (e.g., differences in terrestrial elevation). As such, trackers 310 may not be arranged in aligned rows and/or columns such as depicted in FIG. 1. FIG. 9 depicts a solar-tracking PV system or utility-scale solar farm 300 comprising a plurality of trackers 310 arranged into rows 311 of PV array 302. More particularly, tracker row 311a comprises three trackers 310a, tracker row 311b comprises three trackers 310b, tracker row 311c comprises three trackers 310c, and so on.

PV trackers 310 at or near a perimeter 301 of the array 302 can experience higher wind loads than trackers 310 in the interior of the PV array 302. However, loads on the trackers 310 in the interior of the array can still experience high wind loads because vortices can form as the wind passes across each row 311 of the PV array 302. In PV systems without trackers capable of being positioned in twisted profiles, vortices can build in strength do to the geometrically similarity of each tracker row with the potential of producing significant structural risk to the trackers. Furthermore, all trackers must be designed to support the loads caused by such array-level vortex shedding which can translate to higher material costs. Other methods for inhibiting such vortex formation include optimizing the relative size and spacing of tracker rows to reduce vortex formation and placing the tracker in a stow position, e.g., positioning the tracker in a substantially linear horizontal position so as to adjust wind vortex patterns.

Figure 10:
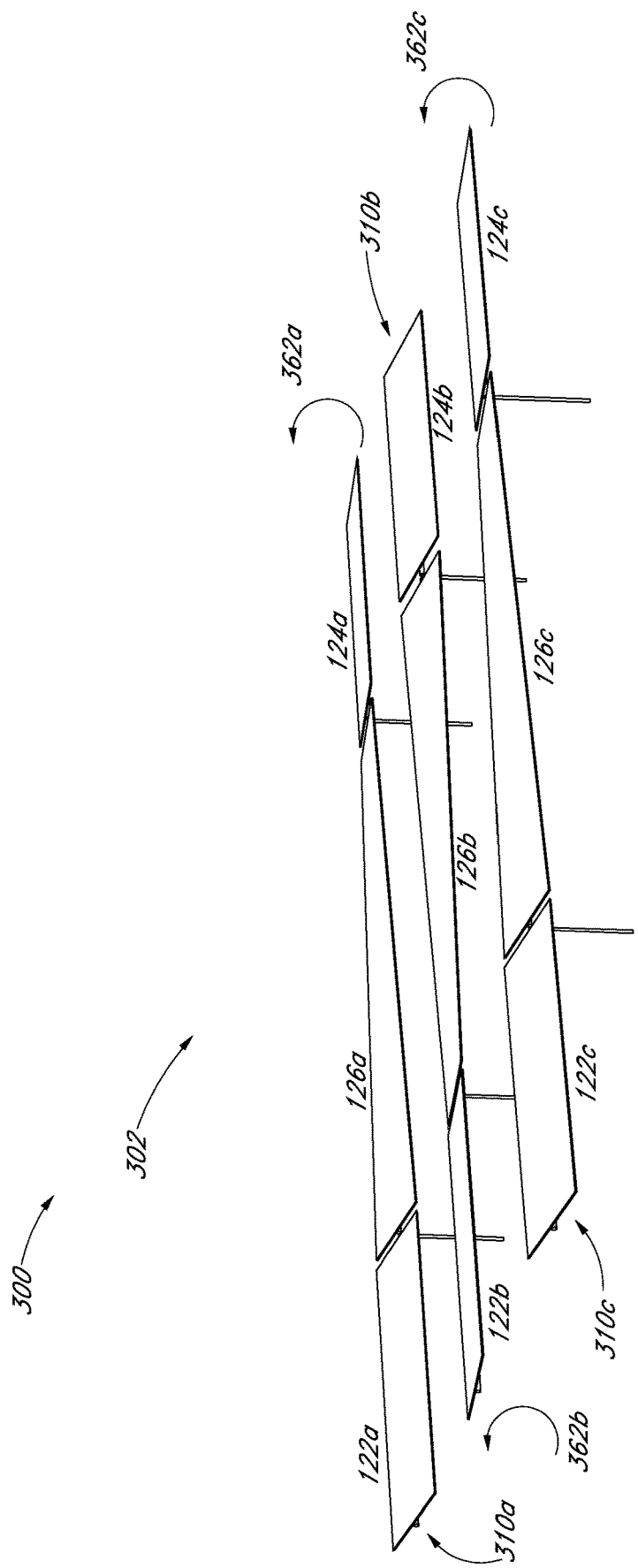
FIG. 10 depicts a side perspective view of a solar-tracking PV system, in accordance with an embodiment of the present disclosure.

We disclose herein solar-tracking PV systems comprising multi-drive trackers having a wind load reduction mechanism such that one or more trackers of a PV array can have a unique aerodynamic profile so as to adjust wind vortex patterns across a PV array. FIG. 10 depicts PV array 302 in a twisted or aerodynamic profile position. A first PV tracker 310a comprises a first end section 122a in a substantially horizontal position, a second end section 124a rotated by a first mechanical torque 362a and a twisted mid-section 126a therebetween. A second PV tracker 310b comprises a first end section 122b rotated by a second mechanical torque 362b, a second end section 124b in a substantially horizontal position and a twisted mid-section 126b therebetween. Similarly, a third PV tracker 310c comprises a first end section 122c in a substantially horizontal position, a second end section 124c rotated by a third mechanical torque 362c and a twisted mid-section 126c therebetween.

Figure 11:
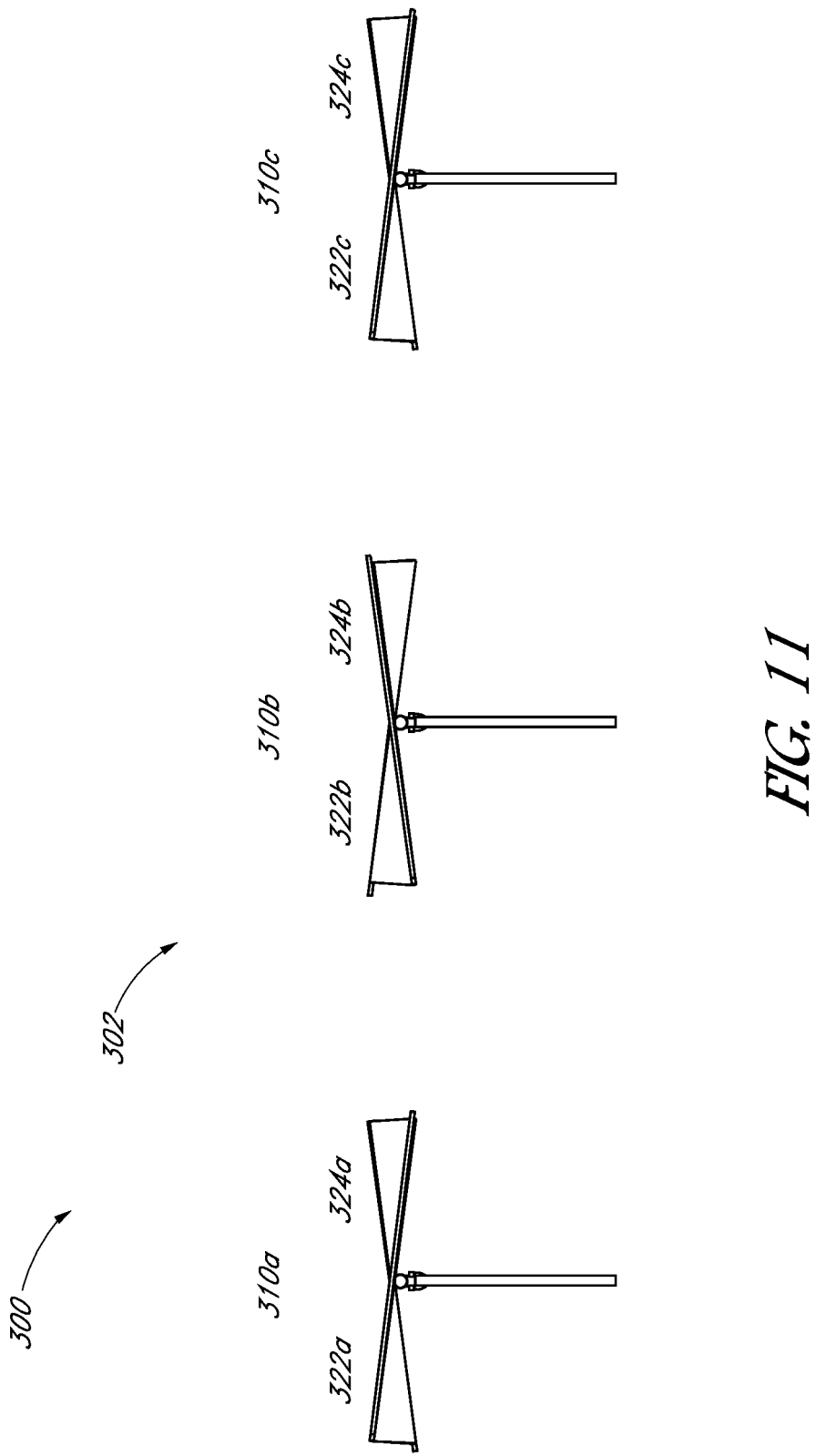
FIG. 11 depicts a side view of a solar-tracking PV system, in accordance with an embodiment of the present disclosure.

FIG. 10 depicts one exemplary twisted or aerodynamic profile position, however it should be appreciated that a solar-tracking PV system can be positioned in various twisted positions and can be transitioned between different twisted positions as desired. FIG. 11 depicts a side view of PV array 302 in a twisted or aerodynamic profile position. The trackers 310a and 310c are positioned similarly such that the first end sections 322a, 322c are rotated to a first twist angle and the second end sections 324a, 324c are rotated to a second twist angle. The tracker 310b is positioned in an opposing twisted position such that the first end section 322b is twisted in an opposite direction from the first end sections 322a and 322c. Furthermore, the second end section 324b is twisted in an opposite direction to second end sections 324a and 324c. Not to be bound by any particular theory, but the opposing twisted positions can create wind load-reducing effects including a reduction in wind load for a down-wind tracker and a reduction in vortex formation as a vortex created by a first tracker will counter a vortex created by an adjacent tracker so as to destructively interfere and inhibit array-level vortex formation.

Positioning trackers into twisted positions can also improve misalignment tolerances due to installation imperfections and improve efficiencies under low solar insolation or shaded conditions. Altering the pitch of PV modules on a torque tube can prevent shading of one PV module of a first tracker by another PV module of an adjacent tracker. By positioning the tracker in a twisted position, the shading profile can be altered so as to reduce a total amount of shading and increase a solar energy collection of a solar-tracking PV system.

During installation of a solar-tracking PV system, tracker(s) may not be installed perfectly. For example, a torque tube may have an angular offset along the length of the tracker. Such errors in installation can be caused by misaligned or imperfect support assemblies, manufacturing tolerances in the torque tube, connecting part misalignment, and/or drive motor-to-drive motor misalignment. Any of these errors can create an angular offset in in the torque tube, which can result in one end section of a tracker having a positive twist relative to an opposite end section of the same tracker. Such an additional twist can cause unexpected shading of an adjacent or neighboring tracker, thereby inhibiting solar yield. Such effects can be countered by controlling the motor drives to produce a counter angle equal and opposite to the positive twist resulting from misalignment. By controlling the motor drives to counter a relative angular offset during operation of the tracker, shading issues can be inhibited without additional tracker maintenance.

As described above, PV trackers 310 at or near a perimeter 301 of the array 302 can experience higher wind loads than trackers 310 in the interior of the PV array 302. High wind loads from the perimeter effect can be accounted for in design of the solar-tracking PV system such that the perimeter trackers can withstand wind loads experienced at the perimeter. Often, this also means that trackers in the interior of the array 302 are over designed and underutilized. For a tracker in a twisted position, stresses can develop at each drive in opposite directions. For example, a first motor drive can have a "pre-stress" or twist in a direction opposite to ambient wind loads while the second motor drive can have a "pre-stress" or twist in the direction of the ambient wind loads. The net "pre-stresses" combined with the stress from ambient wind loads can reduce the net stress on one motor drive at the expense of increased stress on another motor drive. In an embodiment, the direction of the twisting determines which motor drive receives a higher loads. Accordingly, the direction of the twisting can be chosen to lower the stresses on a motor drive closest to the perimeter 301 of the array 302.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown can include some or all of the features of the depicted embodiment. For example, elements can be omitted or combined as a unitary structure, and/or connections can be substituted. Further, where appropriate, aspects of any of the examples described above can be combined with aspects of any of the other examples described to form further examples having comparable or different properties and/or functions, and addressing the same or different problems. Similarly, it will be understood that the benefits and advantages described above can relate to one embodiment or can relate to several embodiments. For example, embodiments of the present methods and systems can be practiced and/or implemented using different structural configurations, materials, and/or control manufacturing steps. The claims are not intended to include, and should not be interpreted to include, means-plus- or step-plus-function limitations, unless such a limitation is explicitly recited in a given claim using the phrase(s) "means for" or "step for," respectively.

What is claimed is:

1. A method of operating a solar-tracking photovoltaic (PV) system comprising a plurality of tracker rows, each of the plurality of tracker rows of the solar-tracking PV system comprising:
    a torque tube extending along a longitudinal axis of the solar-tracking PV system, the torque tube having a first end and a second end;
    a plurality of PV modules mounted on the torque tube;
    a first motor drive coupled to the first end of the torque tube;
    a controller coupled to the first motor drive;
    the method comprising:
        restraining the second end of the torque tube with a locking device;
        determining a first condition for positioning the solar-tracking PV system in a first twisted aerodynamic profile position is present;
        delivering, by the controller, a first electrical power input to the first motor drive;
        converting, by the first motor drive, the first electrical power input into a first mechanical torque;
        applying the first mechanical torque to the first end of the torque tube to rotate the first end of the torque tube in a first angular direction about the longitudinal axis; and
    wherein the first end of the torque tube is rotated to a first predetermined twist angle relative to the second end of the torque tube such that the solar-tracking PV system is positioned in the first twisted aerodynamic profile position.

2. The method of claim 1, wherein each of the plurality of tracker rows of the solar-tracking PV system further comprises:
    a second motor drive coupled to the second end of the torque tube; and
    wherein the method further comprises:
        delivering a second electrical power input to the second motor drive;
        converting the second electrical power input into a second mechanical torque by the second motor drive;
        applying the second mechanical torque to the second end of the torque tube.

3. The method of claim 2, wherein applying the second mechanical torque to the second end of the torque tube comprises rotating the second end of the torque tube in a second angular direction about the longitudinal axis, the second angular direction being opposite the first angular direction.

4. The method of claim 1, wherein determining the first condition is present comprises determining whether an ambient environmental condition is beyond a predetermined threshold limit.

5. The method of claim 4, wherein determining an ambient environmental condition is beyond a predetermined threshold limit comprises determining an ambient wind speed, wind direction or a combination thereof.

6. The method of claim 5, wherein determining an ambient environmental condition comprises sensing an ambient wind speed, wind direction or a combination thereof.

7. The method of claim 1 further comprising transmitting, to the controller, a signal based on a measured ambient environmental condition.

8. The method of claim 1 further comprising:
    monitoring the first electrical power input; and
    determining the first condition is present based on the monitored first electrical power input.

9. The method of claim 1, wherein the solar-tracking PV system further comprises a mechanical linkage for mechanically coupling the plurality of tracker rows, and wherein applying the first mechanical torque to the first end of the torque tube of a first of the plurality of tracker rows comprises transmitting the first mechanical torque to the first end of the torque tube of a second of the plurality of tracker rows via the mechanical linkage.

10. A method of operating a solar-tracking photovoltaic (PV) system comprising a plurality of tracker rows, each of the plurality of tracker rows of the solar-tracking PV system comprising:
    a torque tube extending along a longitudinal axis of the solar-tracking PV system, the torque tube having a first end and a second end;
    a plurality of PV modules mounted on the torque tube;
    a first motor drive coupled to the first end of the torque tube;
    a controller coupled to the first motor drive;
    the method comprising:
        determining a first condition for positioning the solar-tracking PV system in a first twisted aerodynamic profile position is present;
        delivering, by the controller, a first electrical power input to the first motor drive;
        monitoring the first electrical power input, wherein determining the first condition is present based on the monitored first electrical power input;
        converting, by the first motor drive, the first electrical power input into a first mechanical torque;
        applying the first mechanical torque to the first end of the torque tube to rotate the first end of the torque tube in a first angular direction about the longitudinal axis; and
    wherein the first end of the torque tube is rotated to a first predetermined twist angle relative to the second end of the torque tube such that the solar-tracking PV system is positioned in the first twisted aerodynamic profile position.

11. The method of claim 10, wherein each of the plurality of tracker rows of the solar-tracking PV system further comprises:
   a second motor drive coupled to the second end of the torque tube; and
   wherein the method further comprises:
      delivering a second electrical power input to the second motor drive;
      converting the second electrical power input into a second mechanical torque by the second motor drive;
      applying the second mechanical torque to the second end of the torque tube.

12. The method of claim 11, wherein applying the second mechanical torque to the second end of the torque tube comprises rotating the second end of the torque tube in a second angular direction about the longitudinal axis, the second angular direction being opposite the first angular direction.

13. A method of operating a solar-tracking photovoltaic (PV) system comprising a plurality of tracker rows, each of the plurality of tracker rows of the solar-tracking PV system comprising:
   a torque tube extending along a longitudinal axis of the solar-tracking PV system, the torque tube having a first end and a second end;
   a plurality of PV modules mounted on the torque tube;
   a first motor drive coupled to the first end of the torque tube;
   a controller coupled to the first motor drive;
   the method comprising:
      determining a first condition for positioning the solar-tracking PV system in a first twisted aerodynamic profile position is present;
      delivering, by the controller, a first electrical power input to the first motor drive;
      converting, by the first motor drive, the first electrical power input into a first mechanical torque;
      applying the first mechanical torque to the first end of the torque tube to rotate the first end of the torque tube in a first angular direction about the longitudinal axis; and
   wherein the first end of the torque tube is rotated to a first predetermined twist angle relative to the second end of the torque tube such that the solar-tracking PV system is positioned in the first twisted aerodynamic profile position, wherein the solar-tracking PV system further comprises a mechanical linkage for mechanically coupling the plurality of tracker rows, and wherein applying the first mechanical torque to the first end of the torque tube of a first of the plurality of tracker rows comprises transmitting the first mechanical torque to the first end of the torque tube of a second of the plurality of tracker rows via the mechanical linkage.

14. The method of claim 13, wherein each of the plurality of tracker rows of the solar-tracking PV system further comprises:
   a second motor drive coupled to the second end of the torque tube; and
   wherein the method further comprises:
      delivering a second electrical power input to the second motor drive;
      converting the second electrical power input into a second mechanical torque by the second motor drive;
      applying the second mechanical torque to the second end of the torque tube.

15. A method of operating a solar-tracking photovoltaic (PV) system comprising a plurality of tracker rows, each of the plurality of tracker rows of the solar-tracking PV system comprising:
   a torque tube extending along a longitudinal axis of the solar-tracking PV system, the torque tube having a first end and a second end;
   a plurality of PV modules mounted on the torque tube;
   a first motor drive coupled to the first end of the torque tube;
   a controller coupled to the first motor drive;
   the method comprising:
      restraining the second end of the torque tube;
      determining a first condition for positioning the solar-tracking PV system in a first twisted aerodynamic profile position is present;
      delivering, by the controller, a first electrical power input to the first motor drive;
      converting, by the first motor drive, the first electrical power input into a first mechanical torque;
      applying the first mechanical torque to the first end of the torque tube to rotate the first end of the torque tube in a first angular direction about the longitudinal axis; and
   wherein the first end of the torque tube is rotated to a first predetermined twist angle relative to the second end of the torque tube such that the solar-tracking PV system is positioned in the first twisted aerodynamic profile position.

16. The method of claim 15, wherein each of the plurality of tracker rows of the solar-tracking PV system further comprises:
   a second motor drive coupled to the second end of the torque tube; and
   wherein the method further comprises:
      delivering a second electrical power input to the second motor drive;
      converting the second electrical power input into a second mechanical torque by the second motor drive;
      applying the second mechanical torque to the second end of the torque tube.

17. The method of claim 16, wherein applying the second mechanical torque to the second end of the torque tube comprises rotating the second end of the torque tube in a second angular direction about the longitudinal axis, the second angular direction being opposite the first angular direction.

18. The method of claim 15, wherein determining the first condition is present comprises determining whether an ambient environmental condition is beyond a predetermined threshold limit.

19. The method of claim 18, wherein determining an ambient environmental condition is beyond a predetermined threshold limit comprises determining an ambient wind speed, wind direction or a combination thereof.

20. The method of claim 19, wherein determining an ambient environmental condition comprises sensing an ambient wind speed, wind direction or a combination thereof.

* * * * *